(12) United States Patent
Hurley et al.

(10) Patent No.: US 7,213,461 B2
(45) Date of Patent: May 8, 2007

(54) TORSIONAL SHAKER APPARATUS FOR INSPECTING ROTATABLE POWER GENERATION MACHINERY

(75) Inventors: Joseph David Hurley, Casselberry, FL (US); Peter Jon Clayton, Casselberry, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 139 days.

(21) Appl. No.: 11/036,992

(22) Filed: Jan. 18, 2005

(65) Prior Publication Data

US 2005/0193821 A1    Sep. 8, 2005

Related U.S. Application Data

(60) Provisional application No. 60/550,532, filed on Mar. 5, 2004.

(51) Int. Cl.
*G01H 17/00* (2006.01)
*G01N 3/22* (2006.01)
*H02P 7/00* (2006.01)
*H02P 9/00* (2006.01)
*G01M 7/00* (2006.01)

(52) U.S. Cl. ............... 73/662; 73/650; 73/811; 73/814; 73/847; 322/28; 322/86

(58) Field of Classification Search .............. None
See application file for complete search history.

(56) References Cited

U.S. PATENT DOCUMENTS

| | | | |
|---|---|---|---|
| 4,137,780 A | 2/1979 | Wolfinger | |
| 4,283,957 A | 8/1981 | Zobrist et al. | |
| 4,311,253 A * | 1/1982 | Putman et al. | 322/25 |
| 4,384,246 A * | 5/1983 | Larsen et al. | 322/58 |
| 4,793,186 A | 12/1988 | Hurley | |
| 4,862,749 A * | 9/1989 | Yagi | 73/650 |
| 6,229,234 B1 | 5/2001 | Lambert et al. | |

* cited by examiner

*Primary Examiner*—Hezron Williams
*Assistant Examiner*—John C Hanley

(57) ABSTRACT

Apparatus for applying torsional vibration to a rotating machine is provided. In one exemplary embodiment the apparatus includes a permanent magnet machine (12) connected to the rotating machine (22) and configured to generate a three-phase AC output voltage. A converter (36) may be coupled to receive the three-phase AC output voltage from the permanent magnet machine to supply a DC load current. An electrical load (44) (or exciter) may be coupled to the converter to receive the load current. An oscillator (42) is connected to the converter to provide an oscillation signal for modulating the load current from the converter. Modulated load current causes variable loading of the permanent magnet machine thereby creating an oscillatory torque in the permanent magnet machine (12). The oscillatory torque causes torsional vibration in the rotating machine. Various components of the apparatus for applying torsional vibration may be part of a field-deployed power generating system.

13 Claims, 4 Drawing Sheets

TORSIONAL SHAKER APPARATUS FOR INSPECTING ROTATABLE POWER GENERATION MACHINERY

This application claims priority to a provisional application filed on Mar. 5, 2004, having application No. 60/550,532, which is incorporated herein by reference.

FIELD OF THE INVENTION

The present invention is generally related to power generation machinery, and, more particularly, to a torsional shaker apparatus for inspecting large rotatable power generation machinery, such as a turbine-generator.

BACKGROUND OF THE INVENTION

To ensure a specified operational reliability for large rotatable machinery, such as a turbine-generator used to produce electric power, it is necessary to accurately determine the torsional natural frequencies and/or dynamic response of the turbine-generator over a frequency range of interest. One exemplary range may be from approximately 70 Hz to approximately 140 Hz.

For many turbine-generators, the torsional frequency response of rotatable components thereof, such as a rotatable shaft of the turbine-generator, is considered to be a significant design factor of the machine. For example, excessive levels of torsional vibration at the rotating shaft of the turbine-generator may cause stresses that could damage or break the shaft.

It is known that water jets have been used to provide torsional shaking during operation of the turbine-generator. One noticeable disadvantage of this technique is that shaking is essentially limited to frequencies corresponding to harmonics of the rotational frequency of the rotating structure. This is cumbersome and prone to inaccuracies since shaking performed at a harmonic of the rotating frequency, generally results in torsional vibration signals that tend to have large amounts of noise.

It is also known to use a hydraulic shaker that uses electronically-operated valves to control the flow of high pressure hydraulic fluid to a rotating shaker head. The resulting pulsations of hydraulic fluid on the shaker head can generate a relatively high level of torsional torque. In practice, however, the assignee of the present invention has experienced rather poor reliability with such hydraulic shakers.

For field-testing of a turbine-generator, it is known to use at power plant sites a generally time-consuming and burdensome off-line test that involves creating a short circuit on the generator or high-voltage side of a main step-up transformer. This test involves reconfiguring the turbine-generator and its current protection system in order to apply a negative sequence current to the generator for creating shaking power. This technique is also prone to noise issues since the torsional shaking is limited to harmonics of the rotating frequency. For torsional shaking subject to such a constraint, as explained above, the torsional signals tend to have large amounts of noise, and, consequently, a resulting signal-to-noise ratio may not be conducive for accurately determining the torsional natural frequencies and/or dynamic response of the turbine-generator at low-vibration power.

Accordingly, it would be desirable to provide an improved torsional shaker apparatus for large rotating machinery, such as a turbine-generator, that avoids or reduces the foregoing shortcomings.

It is also desirable to provide a torsional inspecting means that may make use of equipment that already may be part of a power generating system and, at a relatively low cost and without requiring any substantial downtime of a machine undergoing inspection, allows for accurately determining the torsional natural frequencies and/or dynamic response of the machine.

BRIEF DESCRIPTION OF THE DRAWINGS

These and other advantages of the invention will be more apparent from the following description in view of the drawings that show.

DETAILED DESCRIPTION OF THE INVENTION

The inventors of the present invention have innovatively recognized inter alia that one can make use of power generating equipment, such as a permanent magnet generator (PMG) and associated control equipment, that may already be part of a power generating system, for torsionally exciting a turbine-generator. By way of example, the torsional excitation may be used to determine the torsional natural frequencies and/or dynamic response of the turbine-generator. In one exemplary embodiment, during a torsional inspection of the turbine-generator, one may configure the PMG to act as a torsional shaker. It will be understood that the PMG need not be part of the power generating system since one may use a separate PMG that could be mounted onto the rotating structure undergoing inspection.

Figure 1:
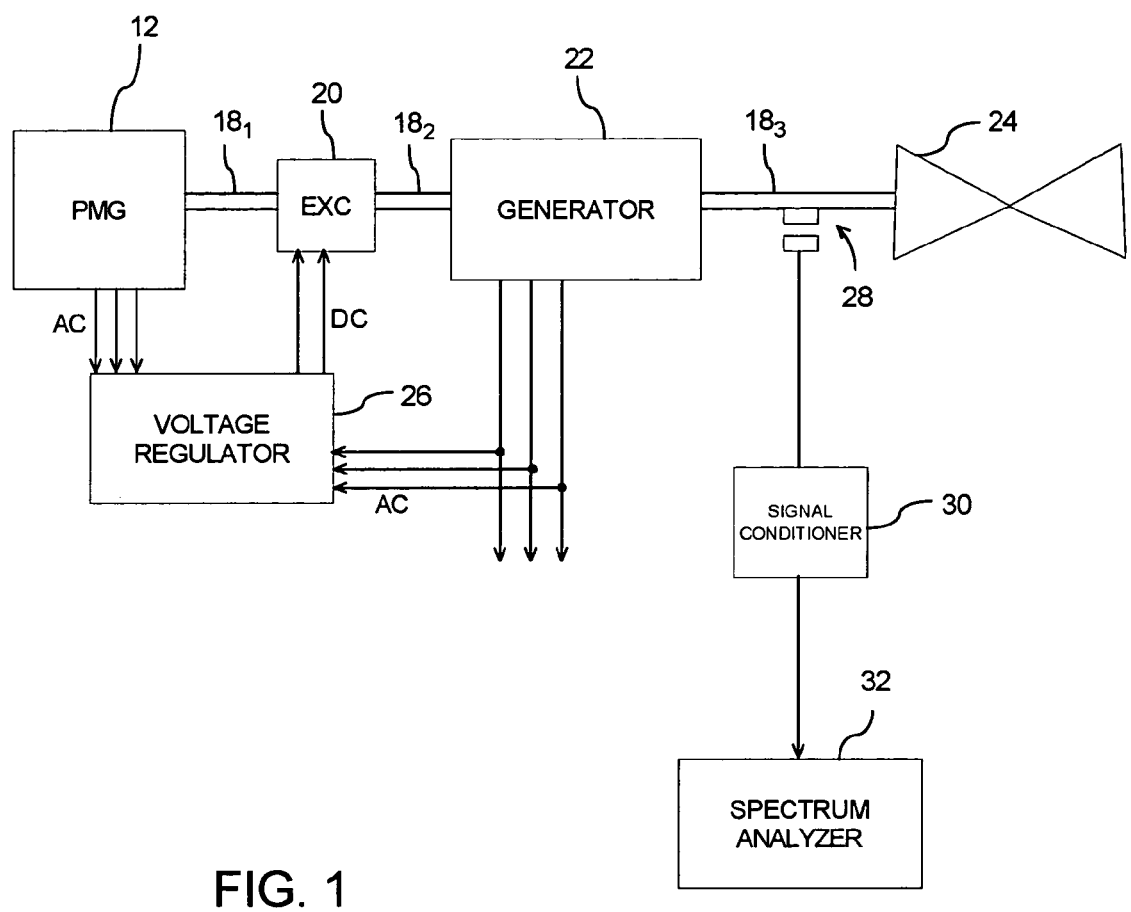
FIG. 1 is a simplified schematic representation of a power generating system that may benefit from aspects of the present invention.

FIG. 1 is a simplified schematic representation of a power generating system 10 that may benefit from aspects of the present invention. Typically, a permanent magnet generator (PMG) 12 is normally used to supply steady-state power to a load. During normal operation of the power system, PMG 12 may be driven via a shaft $18_1$, which also constitutes the rotating shaft for an exciter 20 that supplies a field excitation current to a main generator 22. Exciter 20 is in turn mechanically coupled via rotatable shafts $18_2$ and $18_3$ to main generator 22 and a turbine 24. A voltage regulator 26 is normally used in a closed-loop controller to regulate the alternating current (AC) output voltage of main generator 22 by controlling the field current generated by exciter 20.

In one exemplary embodiment of the invention, as described in greater detail below, the output of PMG 12 is modulated at a sufficiently fast rate to cause torsional vibration of shaft $18_1$ and, in turn, of one or more rotating structures connected thereto, such as rotatable shafts $18_2$ and $18_3$ of main generator 22 and turbine 24.

PMG 12 may be a three-phase electromotive machine that when conventionally used delivers AC voltage at a fixed frequency (e.g., 420 Hz) at rated speed. A plurality of permanent magnet poles is mounted on the rotor of the PMG and the number of such poles may determine some operational characteristics of the PMG. In one exemplary embodiment, a PMG having a rated speed of 3600 RPM may comprise 14 poles. Similarly, an 1800-RPM PMG may comprise 28 poles. If the PMG is not already part of the power system, as may be the case for a factory inspection setup as opposed to a power plant setup, a suitable coupling adapter would be provided to couple the rotor of the PMG to the rotating structure undergoing torsional inspection.

Figure 2:
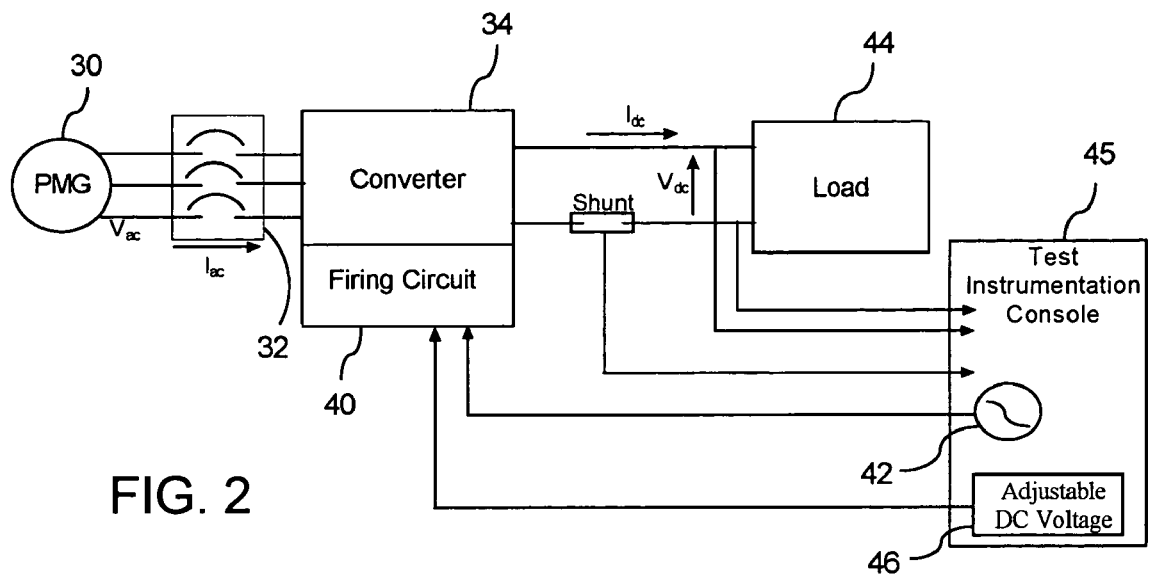
FIG. 2 is a block diagram of exemplary components of a torsional shaker apparatus embodying aspects of the present invention, as may be configured for a factory setup.

FIG. 2 is a simplified block diagram of exemplary components of a torsional shaker apparatus embodying aspects of the present invention, as may be configured for a factory setup. The three-phase terminals of a PMG 30 may be electrically coupled (e.g., through an optional circuit breaker 32) to a solid-state device 34, such as a voltage converter. By injecting a suitable oscillatory signal into a controller for the device 34, one can modulate the direct current (DC) output voltage of the device 34 at a desired rate so that the air gap torque induced at PMG 30 is in turn modulated at the same desired rate. The modulating frequency determines the frequency of the shaking torque and the amplitude of the modulation determines the amplitude of the shaking torque. An advantageous extension of the foregoing approach is that the PMG 12 (FIG. 1) and voltage regulator 26, both of which may be part of a power generation system, can be used at a power plant site to perform a torsional inspection of an in-service turbine-generator in a reliable manner, at a low cost, and with a minimum of outage time.

Figure 3:
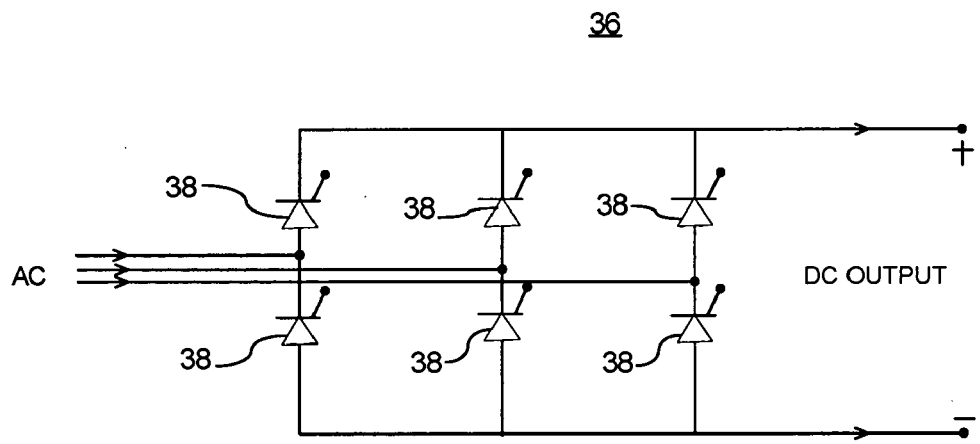
FIG. 3 is a schematic representation of an exemplary controlled full-converter rectifier bridge for a torsional shaker apparatus embodying aspects of the present invention.

In one exemplary embodiment, device 34 may comprise a controlled full-converter rectifier bridge 36 (FIG. 3) made up of suitable power switches 38, e.g., thyristors, insulated-gate bipolar transistors, (IGBTs), metal oxide semiconductor field-effect transistors (MOSFETs), etc., for each leg of the converter bridge. The converter is electrically coupled to a suitable firing circuit 40 (FIG. 2) for providing firing pulses to the gate terminal of the power switches. It will be appreciated that in a power plant set up the rectifier bridge and the firing circuit constitute circuits already embedded in the voltage regulator 26 (FIG. 1).

Figure 4:
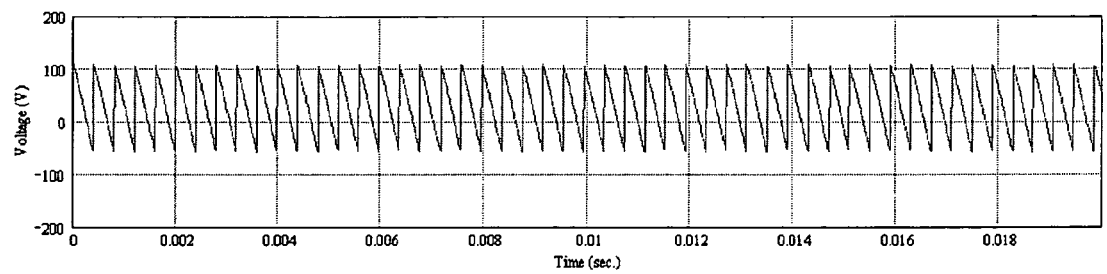
FIG. 4 shows an exemplary non-modulated output signal from the converter of FIG. 3.

Assuming the rectifier bridge 36 is fed by a PMG output signal with a frequency of approximately 420 Hz, the rectifier bridge would provide a DC output switched at a rate of approximately 2520 Hz. An exemplary output signal from the rectifier corresponding to the foregoing situation is illustrated in FIG. 4. It is noted, however, that the DC output voltage of the converter 34 depends upon the phase angle of the firing pulses applied to the power switches therein. Normally, this firing phase angle is held fairly steady (e.g., controlled by a DC signal into the firing circuits) and results in a steady DC output voltage. However, if the firing phase angle is varied, such as in response to an oscillator test signal from a signal generator 42 (FIG. 2), e.g., an oscillator electrically coupled to the firing circuit 40 for testing purposes, the DC output voltage of the converter 34 will also vary.

Figure 5:
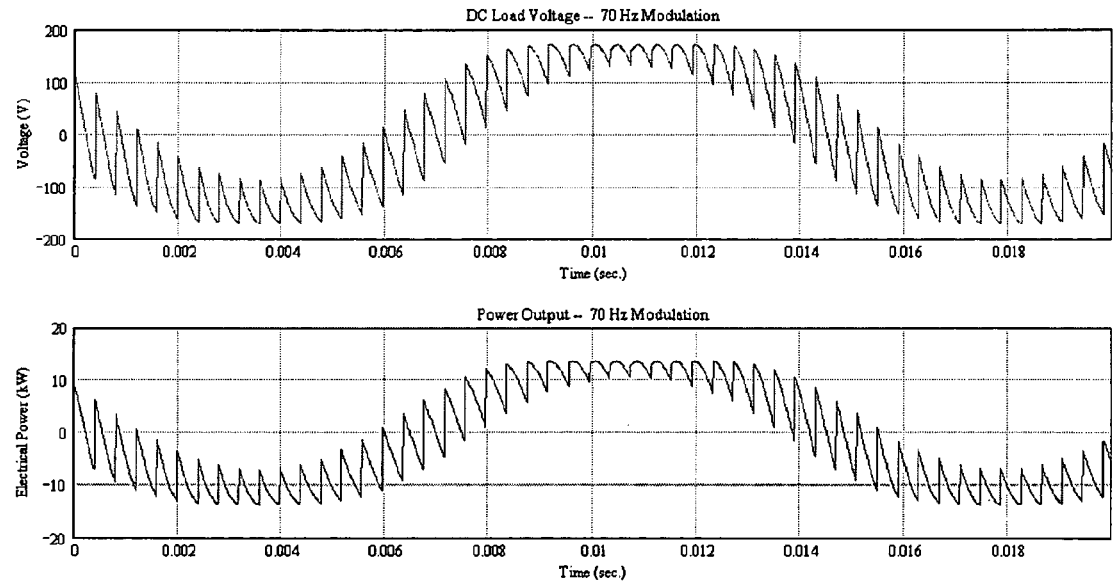
FIG. 5 respectively illustrates an exemplary output voltage signal and an exemplary power signal from the converter of FIG. 3 based on one exemplary modulating frequency, e.g, 70 Hz.
Figure 6:
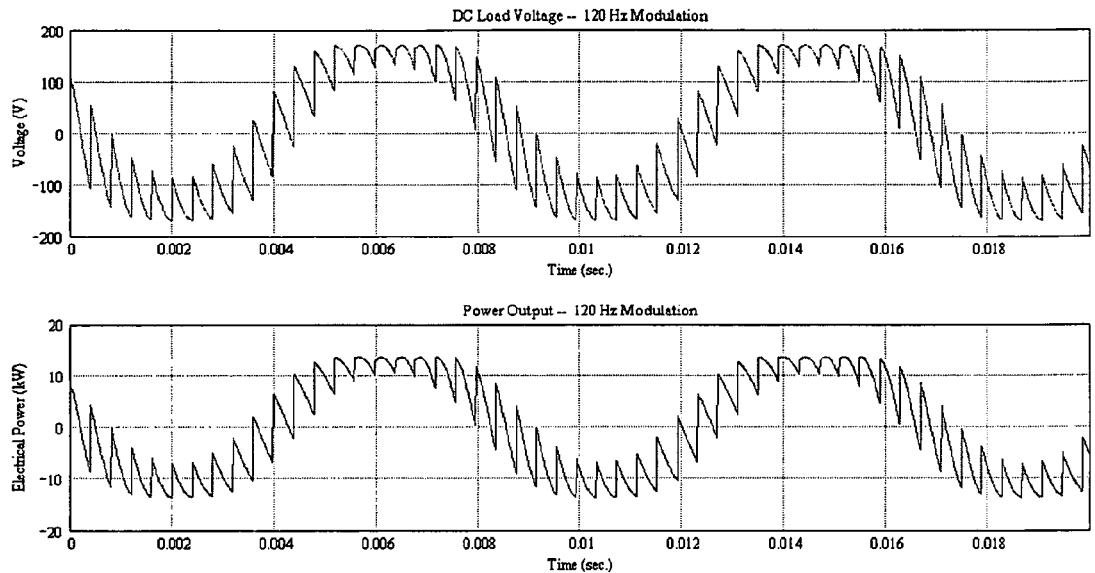
FIG. 6 respectively illustrates an exemplary output voltage signal and an exemplary power signal from the converter of FIG. 3 based on another exemplary modulating frequency, e.g, 120 Hz.

FIG. 5 respectively illustrates an exemplary output voltage signal and an exemplary power signal from the converter 34 based on an oscillator signal having an exemplary frequency of 70 Hz. Similarly, FIG. 6 respectively illustrates an exemplary output voltage signal and an exemplary power signal from the converter 34 based on an oscillator signal having an exemplary frequency of 120 Hz. Assuming a fundamental switching frequency on the order of 2500 Hz, it is contemplated that one could achieve variations in the power amplifier DC output voltage of up to at least 160 Hz.

In a power plant set up, the exciter 20 (FIG. 1) constitutes a load for the PMG 12. However, in a factory setup, where the exciter may not yet be connected to the machinery undergoing torsional inspection, for oscillating torque to be induced at PMG 30 (FIG. 2), the converter output should be connected to a suitable electrical load 44, e.g., a resistive load and/or an inductive load.

In the event a resistive load (resistance=R) is used, then the variations in the power amplifier output current (Idc) would follow the variations in output voltage (Vdc). If the maximum power amplifier DC output voltage is Vmax, then the maximum power variations into the load will vary from $(Vmax)^2/R$ to a minimum of zero. Since in this case (i.e., in the absence of an inductive load) there is no power storage capability, essentially this same variation of power into the load will also be seen as a variation of power (and torque) at the PMG, resulting in a shaking torque. Using some exemplary values, if Vmax=120 Vdc and R=1 ohm, then $(Vmax)^2/R$=14.4 kW, resulting in a maximum shaking power at the PMG of 14.4 kW (peak-to-peak). This would result in 338 in-lbs (p—p) torque at 3600 rpm or 676 in-lb (p—p) torque at 1800 rpm.

For reasons explained below, it is noted that providing a reactive load, e.g., an inductive load for load 44, may be preferable over a plain resistive load. For example, with an inductive load the PMG output power can be modulated over both positive and negative excursions. As long as positive current is flowing out of the converter into the inductive load, the converter would have an incremental capability for generating usable power, notwithstanding that the DC output voltage may have negative swings. For example, when the voltage is positive, power flows out of the PMG into the inductive load. Additionally, when the voltage is negative (while positive current is still flowing), power flow would still continue out of energy stored in the inductive load and back into the PMG.

Furthermore, an inductive load tends to smooth out the current passing therethrough, regardless of relatively fast variations in DC voltage above and below an average steady-state level. Using some exemplary values, if a resistance (R) component of the inductive load is 0.5 ohms, and if the converter output voltage is varied such that Vmax=160 Vdc and Vmin=−120 Vdc, then the average DC voltage would be 40 VDC and the DC current would be 80 Adc. If there is sufficient inductance in the load to hold the DC current relatively close to 80 A during the voltage variations, then the power delivered to the inductive load would vary from approximately 12.8 kW to approximately −9.6 kW. This would result in a maximum shaking power at the PMG of 22.4 kW (p—p), providing a shaking torque of 525 in-lb (p—p) at 3600 rpm or 1050 in-lb (p—p) at 1800 rpm, which constitute relatively higher values as compared to shaking torque values obtained without an inductive load.

In one exemplary embodiment, shaker control would be achieved by monitoring, e.g., in a test instrumentation console, the converter DC voltage and current, while applying both a DC bias signal from an adjustable DC voltage source 46 (to determine the DC output voltage level of the converter) and the magnitude of the oscillator signal from signal generator 42 (to determine a shaking power level) to the firing circuit inputs. Each control input would be adjusted so as to remain within the electrical and thermal capabilities of the involved devices. Shaking power frequency would be determined by the frequency of the oscillator signal from signal generator 42. It will be appreciated that a desired shaking power level could be obtained by varying the magnitude of the oscillator signal in combination with the DC output voltage level.

In operation, if at a given shaking frequency, one was to observe that a rotor torsional measurement device, such as a magnetic pickup 28 (FIG. 1), is sensing a rotor response (as may be monitored in a spectrum analyzer 32 upon suitable signal conditioning in a signal conditioning device 30), then such response could be verified to be likely due to an actual torsional effect by either reducing the shaking level or completely turning it off. If the observed rotor response is reduced or disappears altogether, then this may be a strong indication that the observed rotor response may constitute an actual torsional response. Conversely, if the response remains unchanged, then this may be an indication that the sensed rotor response may be some spurious non-torsional response and/or noise.

In addition to factory testing, a field torsional test on an installed turbine-generator at a power plant site can be performed during on-line or off-line operation of the turbine-generator. By way of example, such a torsional test could be performed in the field using the above-described technique on a power generating system with a brushless excitation system, such as a system that comprises a PMG and a solid-state voltage regulator.

This aspect of the present invention provides at least the following exemplary advantages over known torsional field test procedures: 1) fewer number of devices dedicated for the shaker equipment; 2) reduced turbine-generator down time; and 3) overall test effort would be significantly reduced. For example, one known torsional field test procedure including set-up time and time for reconfiguring the turbine-generator may typically consume approximately 16 hours. It is contemplated that a field test performed with a torsional shaker embodying aspects of the present invention may use approximately 2.5 hours.

Moreover, since the torsional shaking can be performed at frequencies which do not coincide with harmonics corresponding to the rotational speed of the rotating structure, noise levels between such harmonics would be relatively small and this would enable to measure relatively lower levels of rotor response as may be obtained with a corresponding lower level of shaking torque. It will be appreciated that when one configures the PMG as a shaker in a field-deployed power generating system with a brushless excitation system in place, then the exciter field would act as an inductive load, and there is no need to connect a separate load, as described in the context of FIG. 2 for a factory setup.

Figure 7:
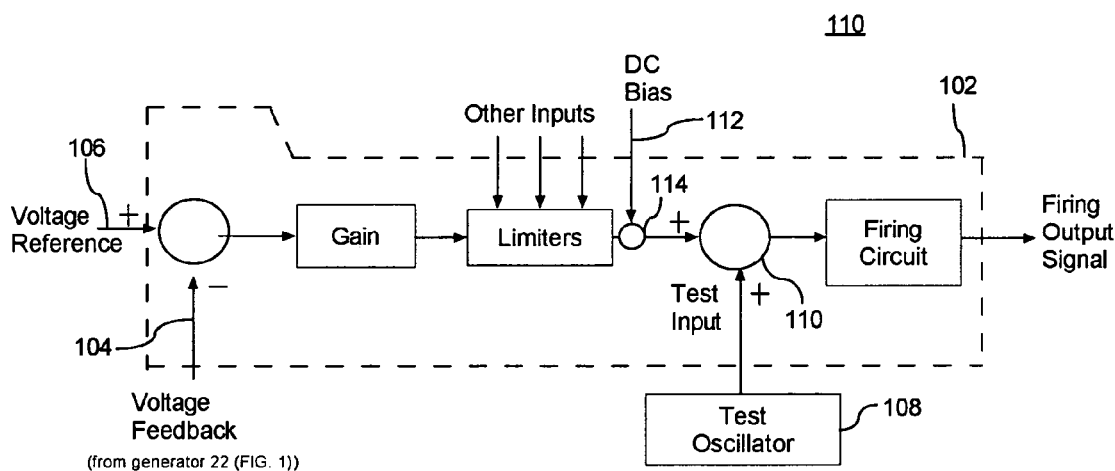
FIG. 7 is a simplified block diagram representation for an exemplary controller for a torsional shaker that, in accordance with aspects of the present invention, can use power generation equipment normally utilized in a power generating system.

FIG. 7 illustrates an exemplary controller 100 for a torsional shaker that, in accordance with aspects of the present invention, can use power generation equipment normally utilized in a power generating system. FIG. 7 in part illustrates a controller 102 normally included in voltage regulator 26 (FIG. 1). In accordance with aspects of the present invention, controller 102 is configured to modulate the firing signal provided to the power switches in the controlled full-converter rectifier bridge 36 (FIG. 3), that is also normally included in the voltage regulator.

In one exemplary embodiment, the modulation may be performed in a voltage control loop normally used for controlling a voltage feedback signal 104 (e.g., the main generator output voltage) relative to a reference voltage signal 106, (e.g., a signal indicative of a command for the main generator 22). An oscillation signal from a variable-frequency oscillator 108 (e.g., an external signal generator) is applied to a summing input node 110 (e.g., normally used as a test input) within the voltage control loop, as shown in FIG. 7.

As discussed in the context of FIG. 2, this oscillator signal would cause modulation of the firing control signal. This in turn would modulate the DC output voltage supplied from the voltage regulator 26 to the exciter 20 (FIG. 1). The oscillator signal amplitude affects the magnitude of torsional shaking generated at shaft 181, and the oscillator frequency would determine the frequency of torsional shaking at shaft 181. An externally-derived DC bias signal 112 (e.g., from an adjustable DC voltage source) may be fed at a summing node 114 to determine the DC output voltage level from the voltage regulator. Thus, it will be appreciated that for the exemplary power generating system of FIG. 1, the simple addition of an oscillator and an adjustable DC voltage source would allow PMG 12 to generate torsional torque at a desired level and frequency.

It is noted that while the foregoing modulation action for performing torsional shaking is occurring, the voltage regulator 26 would be functioning in normal fashion to control the level of the main generator terminal voltage. That is, the torsional inspection may be performed without any significant operational disruption to the power generating system. Rotating means, such as a drive motor or a connected turbine, (e.g., turbine 24 in FIG. 1) may rotatingly drive the structures undergoing torsional inspection.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. Apparatus for applying torsional vibration to a rotating machine, said apparatus comprising:

a permanent magnet machine connected to the rotating machine and configured to generate a three-phase AC output voltage;

a converter coupled to receive said three-phase AC output voltage from the permanent magnet machine to supply a DC load current;

an electrical load coupled to said converter to receive said load current; and an oscillator connected to the converter to provide an oscillation signal for modulating the load current, wherein a modulated load current causes variable loading of the permanent magnet machine thereby creating an oscillatory torque in the permanent magnet machine, said oscillatory torque causing torsional vibration in the rotating machine.

2. The apparatus of claim 1 wherein the rotating machine comprises a turbine-generator that is part of a field-deployed power generating system.

3. The apparatus of claim 2 wherein said permanent magnet machine is part of the field-deployed power generating system.

4. The apparatus of claim 2 wherein said converter is part of a voltage regulator that in turn is part of the field-deployed power generating system.

5. The apparatus of claim 2 wherein said load comprises an exciter that is part of the field-deployed power generating system.

6. The apparatus of claim 2 further comprising a DC source for generating a variable DC biasing signal, wherein said variable DC biasing signal is combined with the oscillation signal for modulating the load current to produce a variable biasing level in the oscillatory torque created in the permanent magnet machine.

7. The apparatus of claim 1 wherein said oscillator comprises means for selecting at least one of a frequency value and an amplitude value for the oscillation signal, wherein the selected frequency value corresponds to a torsional vibration frequency, and further wherein the selected amplitude value affects the magnitude of the torsional vibration.

8. The apparatus of claim 1 wherein the electrical load is selected from the group consisting of a resistive load, and an inductive load.

9. A power generating apparatus comprising:
a main generator;
an exciter mechanically connected to the main generator and configured to control a field current for said main generator;
a permanent magnet generator mechanically connected to the exciter and configured to generate an AC output;
a converter for receiving the AC output and produce a DC output for controlling the exciter; and
a means for imposing a test oscillation on the DC output, said means effective to cause a variable loading of the permanent magnet machine thereby producing an oscillatory torque in the permanent magnet machine, said oscillatory torque causing a torsional vibration in the main generator.

10. The apparatus of claim 9, wherein said means for imposing comprises an oscillator for providing an oscillating test signal to the converter.

11. The apparatus of claim 9 further comprising a closed-loop controller for controlling an output voltage from said main generator, and further wherein, said controller remains unimpeded from controlling the output voltage from said main generator when the means for imposing are operated to cause the variable loading of the permanent magnet machine.

12. In a power generating system including a main generator, an exciter, and a permanent magnet generator interconnected by respective rotating shafts, an apparatus for imposing a test torsional vibration load on the power generating system, the apparatus comprising electrical means for imposing a test oscillation to a load current received by the exciter, said means for imposing effective to cause a variable loading of the permanent magnet machine thereby producing an oscillatory torque in the permanent magnet machine, said oscillatory torque causing a torsional vibration along the respective rotating shafts.

13. The apparatus of claim 12, wherein said electrical means comprises an oscillator for providing an oscillating test signal to a voltage regulator connected to supply the load current to the exciter.

* * * * *